(12) United States Patent
Gotta et al.

(10) Patent No.: US 6,984,344 B2
(45) Date of Patent: Jan. 10, 2006

(54) PRODUCTION PROCESS OF A COMPOSITE NUCLEAR FUEL MATERIAL COMPOSED OF (U, PU)$O_2$ AGGREGATES DISPERSED IN A $UO_2$ MATRIX

(75) Inventors: Marie-Jeanne Gotta, Pierrevert (FR); Grégoire Toury, Ablis (FR); Maria Trotabas, L'Etang la Ville (FR)

(73) Assignees: Commissariat a l'Energie Atomique, Paris (FR); Compagnie Generalc des Matieres Nucleaires, Velizy-Villacoublay (FR)

( * ) Notice: Subject to any disclaimer, the term of this patent is extended or adjusted under 35 U.S.C. 154(b) by 6 days.

(21) Appl. No.: 10/482,772

(22) PCT Filed: Jul. 2, 2002

(86) PCT No.: PCT/FR02/02301

§ 371 (c)(1),
(2), (4) Date: Jan. 2, 2004

(87) PCT Pub. No.: WO03/005375

PCT Pub. Date: Jan. 16, 2003

(65) Prior Publication Data

US 2004/0201003 A1   Oct. 14, 2004

(30) Foreign Application Priority Data

Jul. 4, 2001   (FR) ................... 01 08871

(51) Int. Cl.
*C01G 43/025*   (2006.01)
*G21C 3/60*     (2006.01)
*G21C 3/62*     (2006.01)
*G21C 21/02*    (2006.01)

(52) U.S. Cl. ............. 252/643; 264/0.5; 423/251; 423/261

(58) Field of Classification Search ............... 252/643; 264/0.5; 423/251, 261
See application file for complete search history.

(56) References Cited

U.S. PATENT DOCUMENTS

| | | | | |
|---|---|---|---|---|
| 3,355,393 A | * | 11/1967 | Swanson | 252/639 |
| 3,375,306 A | * | 3/1968 | Brett et al. | 264/0.5 |
| 3,887,486 A | * | 6/1975 | Googin et al. | 252/642 |
| 3,995,000 A | * | 11/1976 | Butler et al. | 264/0.5 |
| 4,020,131 A | * | 4/1977 | Feraday | 264/0.5 |
| 4,231,976 A | * | 11/1980 | Bischoff et al. | 264/0.5 |
| 4,247,495 A | * | 1/1981 | Ennerst et al. | 264/0.5 |
| 4,314,952 A | * | 2/1982 | Zawidzki | 264/0.5 |
| 4,348,339 A | * | 9/1982 | Assmann et al. | 264/0.5 |
| 4,637,900 A | * | 1/1987 | Frederickson | 252/643 |
| 4,643,873 A | * | 2/1987 | Hayes | 252/643 |
| 4,687,601 A | * | 8/1987 | Bachelard et al. | 252/638 |

(Continued)

FOREIGN PATENT DOCUMENTS

FR   2 622 343 A1   4/1989

(Continued)

*Primary Examiner*—Joseph D. Anthony
(74) *Attorney, Agent, or Firm*—Hutchinson & Mason PLLC

(57) ABSTRACT

The invention relates to a production process of a composite material composed of aggregates of a blend of $UO_2$ and of $PuO_2$ dispersed in a $UO_2$ matrix comprising the steps of dry co-grinding of a $UO_2$ powder and of a $PuO_2$ powder in order to obtain a homogenous primary blend, of consolidating the primary blend in order to obtain cohesive aggregates, of sieving the aggregates in a range of 20 to 350 µm, of diluting the sieved aggregates in a $UO_2$ matrix in order to obtain a powder blend, of pelletising the powder blend and of sintering the pellets obtained in order to obtain the composite.

16 Claims, 3 Drawing Sheets

U.S. PATENT DOCUMENTS

| | | | |
|---|---|---|---|
| 4,985,183 A * | 1/1991 | Yato et al. | 264/0.5 |
| 5,841,200 A * | 11/1998 | Bauer et al. | 264/0.5 |
| 5,882,552 A * | 3/1999 | Song et al. | 264/5 |
| 6,320,091 B1 * | 11/2001 | Ebbinghaus et al. | 588/10 |
| 6,783,706 B1 * | 8/2004 | Vandergheynst et al. | 264/0.5 |
| 6,808,656 B2 * | 10/2004 | Gradel et al. | 264/0.5 |
| 2003/0146312 A1 * | 8/2003 | Masson et al. | 241/24.1 |

FOREIGN PATENT DOCUMENTS

| | | |
|---|---|---|
| FR | 2 738 076 A1 | 2/1997 |
| GB | 2004256 A | 3/1979 |
| WO | WO 00/45394 A1 | 8/2000 |
| WO | WO 01/03143 A1 | 1/2001 |

\* cited by examiner

PRODUCTION PROCESS OF A COMPOSITE NUCLEAR FUEL MATERIAL COMPOSED OF (U, PU)O₂ AGGREGATES DISPERSED IN A UO₂ MATRIX

FIELD OF THE INVENTION

This invention relates to a production process of a composite nuclear fuel material composed of aggregates of a ground powder blend of $UO_2$ and $PuO_2$ dispersed in a $UO_2$ matrix preferably depleted in $^{235}U$.

The composite in question possesses after sintering a microstructure of ceramic-ceramic (CERCER) type in the form of relatively spherical calibrated aggregates of solid solution $(U,Pu)O_2$ dispersed in the $UO_2$ matrix.

This is a nuclear fuel material with improved fission gas release properties.

BRIEF DESCRIPTION OF THE BACKGROUND ART

MOX (Mixed Oxide) fuel is at present produced industrially using a process known as MIMAS (MIcronized MASter blend). This process comprises successively a step of grinding oxides of uranium and plutonium, a step of diluting the powders obtained (primary blend) in the uranium oxide ($UO_2$) and a step of sintering.

The MOX fuel produced by this process has a two-phase structure, one phase $(U,Pu)O_2$ composed of solid solutions with a Pu/U+Pu content that can vary in the range of 30 to 5% of Pu and a $UO_2$ phase. The $(U,Pu)O_2$ phase exists either in aggregate form or in the form of "filaments" forming a continuous network in the fuel.

On irradiation, the fission gases are essentially created in the plutonium-bearing zones and install themselves over short distances (7 to 9 $\mu$m) then diffuse through the $UO_2$ matrix before being released outside the fuel.

An improvement of the material consists in exacerbating the biphasic character of the present fuel to tend towards a material that isolates the plutonium-bearing zones in a $UO_2$ matrix, which is intended to act as a retention barrier to the fission gases.

SUMMARY OF THE INVENTION

The precise object of the present invention is to provide a production process for a composite material consisting of cohesive aggregates of a ground powder blend of $UO_2$ and of $PuO_2$ dispersed in a $UO_2$ matrix that makes it possible to obtain a material capable of limiting fission gas release.

The cohesive aggregates are obtained, according to the invention, either by mechanical granulation, or by calcinating the primary blend of $UO_2$ and $PuO_2$.

The process of the present invention includes the following steps:
  dry co-grinding a $UO_2$ powder and a $PuO_2$ powder so as to obtain a homogenous primary blend,
  consolidating the primary blend so as to obtain cohesive aggregates of the blend of $UO_2$ and of $PuO_2$,
  sieving the aggregates between 20 and 350 $\mu$m,
  diluting the sieved aggregates in a $UO_2$ matrix so as to obtain a powder blend,
  pelletising the powder blend, and
  sintering the pellets obtained in order to obtain the composite.

The process of the present invention makes it possible to isolate the fissile matter comprising the plutonium-bearing aggregates of calibrated ground powders of $UO_2$ and of $PuO_2$ and to distribute them homogenously through the fertile matrix composed of $UO_2$.

Appended FIGS. 2a), 2b) and 3 represent three photographs of microstructures of sintered composite materials composed of precalcinated or granulated aggregates (marker 1) of $(U,Pu) O_2$ dispersed in a $UO_2$ matrix (marker 2).

According to the invention, the primary blend of $UO_2$ and of $PuO_2$ is comprised preferably of a $UO_2$ content in the range of 60 to 90 wt. % and of a $PuO_2$ content in the range of 40 to 10 wt. % of the total mass of the blend, preferably 75 wt. % of $UO_2$ and 25 wt. % of $PuO_2$. The mass of $PuO_2$ can be totally or partially replaced by discarded manufactured powders comprised of mixed oxides $(U,Pu) O_2$.

According to a first embodiment of the present invention, the step of consolidation to obtain cohesive aggregates can include the following steps:
  compacting the homogenous primary blend at a pressure in the range of 150 to 600 MPa in order to obtain a blank,
  crushing the blank obtained in order to obtain granules, and
  spheroidising the granules.

This first embodiment of the present invention comprises mechanically granulating the primary blend compacts. This consolidation brings about sufficient cohesion of aggregates to withstand without deterioration the subsequent steps of diluting and pelletising of the process of the present invention. The blend can be compacted by using a single or double effect uniaxial press. This is preferably carried out at a pressure of 300 MPa. The crushing can be carried out using any known appropriate means, for example using an industrial crusher. The granules can for example be spheroidised using simple self-abrasion of the crushed products, for example in a mixer of the TURBULA (registered trademark) type (oscillo-rotary mixer-shaker).

According to a second embodiment of the present invention, the consolidation of a primary blend can be carried out using a heat treatment calcinating the primary blend at a temperature of 1000 to 1400° C., preferably at a temperature of 1000° C. The consolidated primary blend is the mixture of $UO_2$ and of $PuO_2$ produced by co-grinding. Calcination gives the primary blend a sufficient degree of cohesion for it to withstand without deterioration the subsequent steps of dilution and pelletising of the process of the present invention while preserving high sphericity. Preferably, the heat treatment is carried out in an humidified or non-humidified atmosphere of 95 vol. % argon and 5 vol. % hydrogen. When the heat treatment atmosphere is humidified, it is preferably humidified with a partial pressure ratio $P_{H2}/P_{H2O}$ in the range of 50 to 20.

The sieving can be carried out using a stainless steel sieve with mesh size in the range of 20 to 350 $\mu$m, preferably in the range of 125 to 350 $\mu$m. Thus the cohesive aggregates can have a dimension (diameter) in the range of 20 to 350 $\mu$m, preferably in the range of 125 to 350 $\mu$m.

The dilution of the aggregates in the $UO_2$ matrix can be carried out for example by mechanical stirring. This should preferably not break the aggregates. The aggregates can be diluted in the $UO_2$ matrix at a concentration of 20 to 35 vol. % of the total volume of the green blend obtained, preferably at a concentration of 20 vol. % of the total volume of the green blend. These quantities yield a composite material advantageously containing between 2.1 and 9.45% of plutonium oxide.

According to the invention, pelletising can be carried out using a uniaxial hydraulic press, for example at a pressure of 500 MPa.

According to the invention, the sintering step can be carried out a temperature of approximately 1700° C. It can be carried out in a sintering furnace by following a thermal cycle comprising the following successive steps of:

raising the temperature at 200° C./hour, plateauing at approximately 1700° C., and cooling at approximately 400° C./hour down to 1000° C., then by following furnace inertia.

The sintering step is preferably carried out in an humidified or non-humidified atmosphere of 95 vol. % argon and 5 vol. % hydrogen. When the sintering atmosphere is humidified, it is preferably humidified with a partial pressure ratio $P_{H2}/P_{H2O}$ in the range of 50 to 20.

Other characteristics and advantages will become obvious on reading the following examples, which are, of course, given to illustrate the invention and not to limit it as refers to the appended drawings.

EXAMPLES

Figure 1:
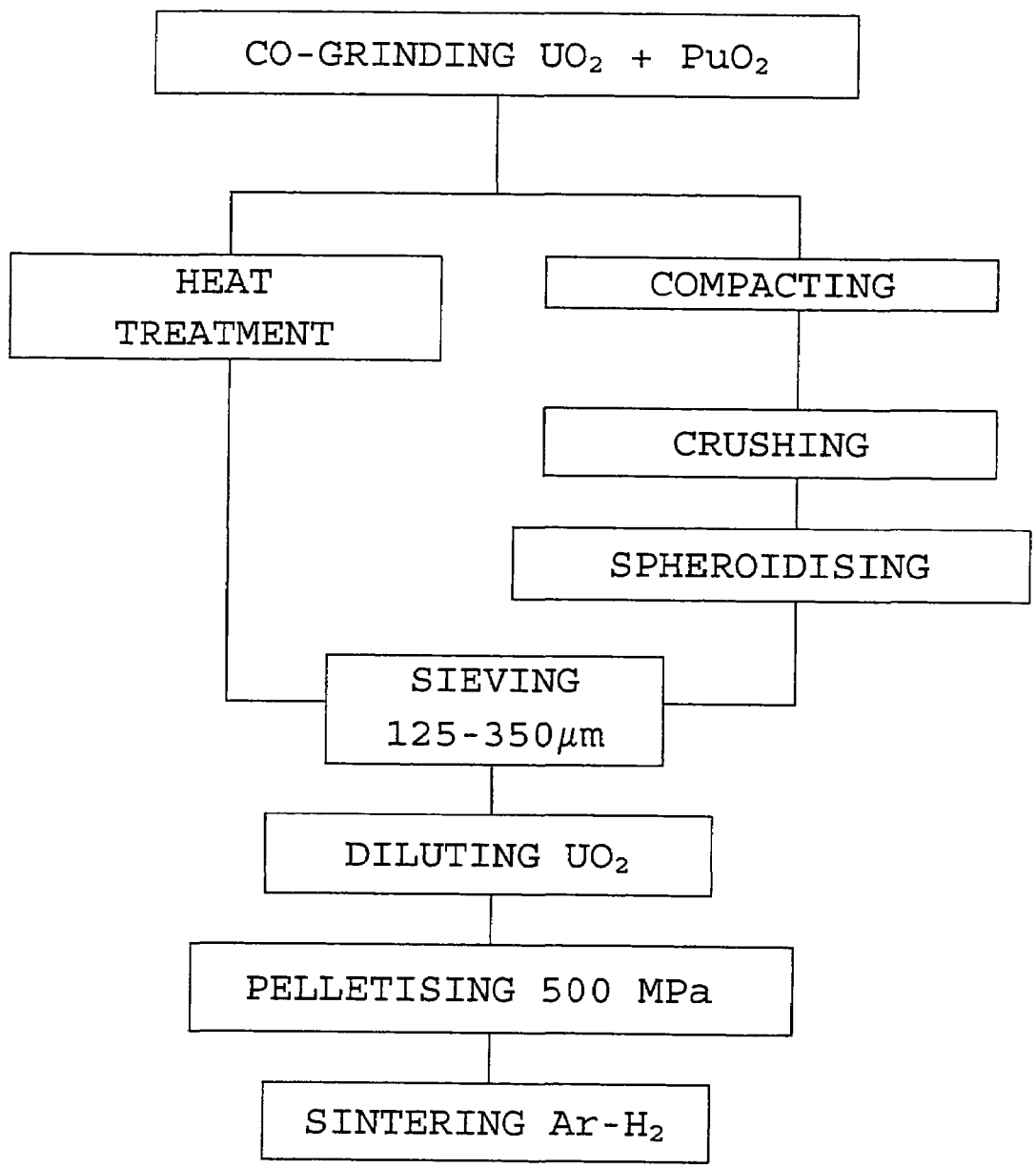
FIG. 1 represents a flow chart of the sequence of the different steps of the production process of a composite according to the process of the present invention.

The sequence of the different steps of the manufacturing process of sintered composites consisting of aggregates of solid solution of $(U,Pu)O_2$ dispersed in a $UO_2$ matrix according to the process of the present invention is indicated in the flow chart in FIG. 1.

Example 1

Dry Co-grinding of $UO_2$ and $PuO_2$ Powders

Different homogenous matrix blends of powders of uranium and plutonium dioxides produced by processes known to prior art have been produced with proportions of powders in the ranges of 60 to 90 wt. % of $UO_2$ and of 40 to 10 wt % of $PuO_2$ compared to the total mass of the blend.

These blends were produced by dry co-grinding the rough powders, in a jar rotating at 48 r.p.m. for 6 hours. The grinding media were uranium metal balls. No organic, pore-forming or lubricant additives were used.

Example 2

Consolidation of the Primary Blend by Mechanical Granulation

This example illustrates a first embodiment of the consolidation step of the aggregates of the process of the present invention.

One of the matrix blends at 25 vol. % of $PuO_2$ obtained in example 1 was compacted in different tests at different granulation pressures in a range of 0 (non-compacted powder from co-grinding) to 600 MPa, using a single effect uniaxial press.

The blanks thus obtained were then crushed manually in an agate mortar, and the crushed products obtained were spheroidised by self-abrasion by a Pyrex (commercial brand) round bottom flask inserted in a grinding jar rotating at 48 r.p.m. for one and a half hours.

Example 3

Consolidation of the Primary Blend by Heat Treatment

This example illustrates a second embodiment of the consolidation step of the aggregates of the process of the present invention.

The heat treatment was applied to one of the matrix blends at 25 vol. % of $PuO_2$ obtained in example 1, in a flow of a non-humidified 95% Ar-5% $H_2$ mixture.

The thermal cycle used corresponded to a rise in temperature at 200° C./hour to a temperature of 1000, 1200 or 1400° C. followed, with no plateau, by cooling at 400° C./hour to ambient temperature.

This consolidation treatment produced consolidated aggregates of high sphericity, for each blend of $UO_2$ and of $PuO_2$.

Example 4

Sieving the Aggregates

The aggregates obtained in examples 2 and 3 were sieved using a stainless steel sieve with mesh size in the range of 125 to 250 μm.

Example 5

Diluting the Sieved Aggregates in the $UO_2$ Matrix

After mechanical granulation or thermal consolidation, the plutonium-bearing aggregates were mixed with $UO_2$ powder for 1 hour 30 minutes in a round bottom flask placed on the driving rolls of a grinder and turning at a speed of 46 r.p.m.

Example 6

Pelletising the Green Blend

Shaping the composites by pelletising was done using a single effect uniaxial press, operating at a pressure of 500 MPa. A pellet of zinc stearate was pressed regularly after producing two cylinders of composite, in order to ensure the lubrication of the press matrix. The samples obtained took the form of cylinders of approximately 7 mm in diameter and 9 mm in height.

Example 7

Sintering the Pellets Obtained in Example 6 in Order to Form the Composite

The samples placed in a sintering box were sintered in a Degussa (commercial brand) bell furnace. The thermal cycle used was as follows:
  raising the temperature at 200° C./hour;
  4 hours of plateau at 1700° C.;
  cooling at 400° C./hour down to 1000° C., then by following switched off furnace inertia until ambient temperature was reached.

The different composites were sintered in a reducing atmosphere consisting of a flow of a non-humidified mixture of 95% argon and 5% hydrogen. A level of residual humidity of approximately 100 ppm was measured in the gas at furnace exit, at ambient temperature. This corresponds to an oxygen potential, $\Delta G°$, at 1700° C. of −478 kJ/mole$O_2$.

The characteristics of the $UO_2$—$PuO_2$ aggregates used and of the CERCER composites obtained are presented in the following table 1.

TABLE 1

| | | CHARACTERISTICS OF AGGREGATES | | | | CHARACTERISTICS | | |
|---|---|---|---|---|---|---|---|---|
| | Test n° | Wt. % of $PuO_2$ | Granulation pressure (MPa) | Calcination Temperature (° C.) | Green Apparent Density (g/cm$^3$) | Aggregate Fractional Volume | Wt. % of $PuO_2$ | Green Apparent Density (g/cm$^3$) | Sintered Apparent Density (g/cm$^3$) |
| Granulation | 1 | 10 | 300 | nil | 6.8 | 20.2 | 2.1 | 6.5 | 10.5 |
| | 2 | 25 | 300 | nil | 6.9 | 19.9 | 5.3 | 6.5 | 10.5 |
| | 3 | 40 | 300 | nil | 7.0 | 20.5 | 8.6 | 6.5 | 10.5 |
| | 4 | 25 | 600 | nil | 7.3 | 25.6 | 7.35 | 6.5 | 10.5 |
| | 5 | 25 | 300 | nil | 6.9 | 35.7 | 9.45 | 6.6 | 10.5 |
| Reference Example | 6 | 25 | nil | nil | 5.4 | 25.0 | 5.2 | 6.6 | 10.5 |
| Heat Treatment | 7 | 25 | nil | 1000 | 7.3 | 18.5 | 4.9 | 6.5 | 10.5 |
| | 8 | 25 | nil | 1200 | 8.0 | 20.2 | 5.6 | 6.5 | 10.5 |
| | 9 | 25 | nil | 1400 | 9.6 | 20.1 | 6.2 | 6.6 | 10.2 |

Figure 2A:
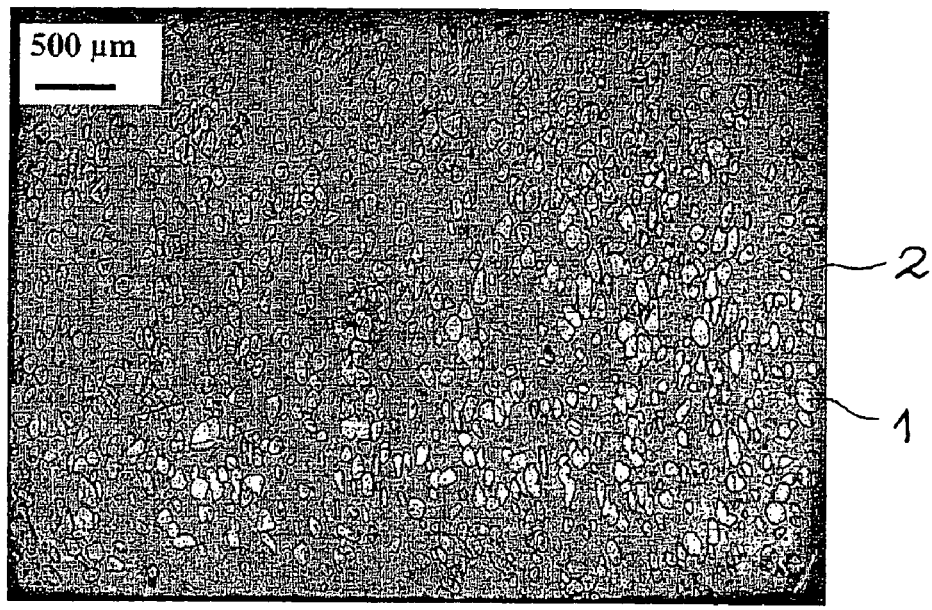
FIG. 2a) is a photograph of a microstructure obtained by the mechanical granulation process of the present invention at a magnification of ×20, after 4 hours of sintering at 1700° C. in a non-humidified 95% Ar-5% $H_2$ atmosphere, of a CERCER composite containing 20 vol. % of aggregate 75% $UO_2$-25% $PuO_2$ granulated after compaction at 300 MPa (image obtained by optical microscopy)
Figure 2B:
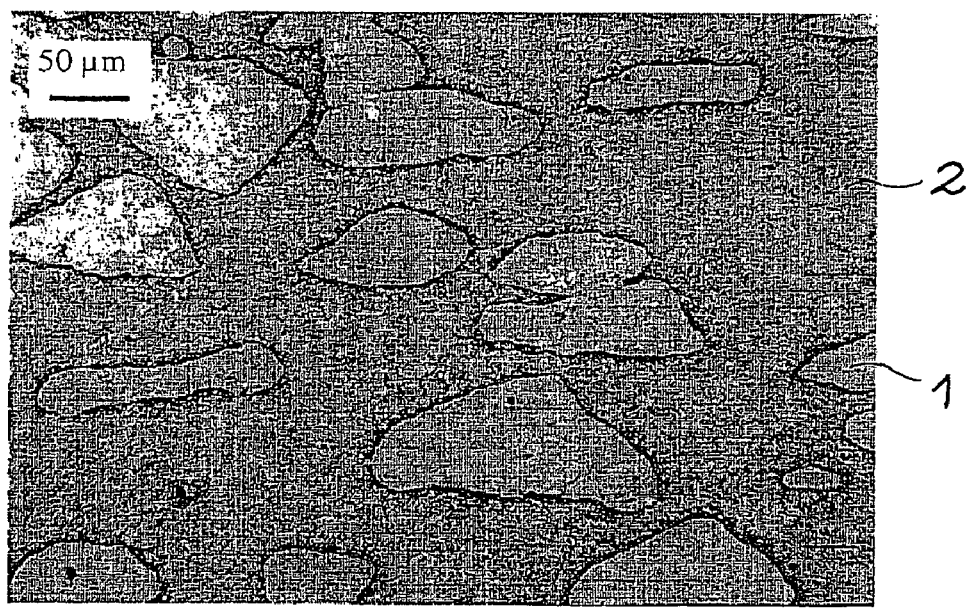
FIG. 2b) is a photograph of the material represented in FIG. 2a) at a magnification of ×200.
Figure 3:
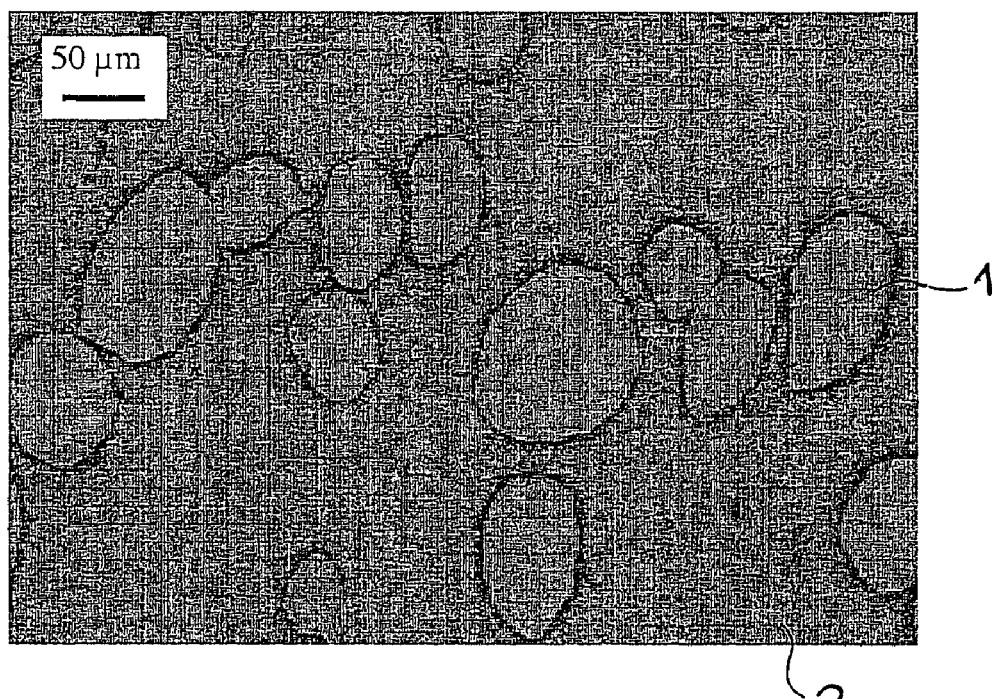
FIG. 3 represents a photograph of a microstructure of a composite material consisting of a solid solution $(U,Pu)O_2$ dispersed in a $UO_2$ matrix, at a concentration of 20 vol. % of aggregates consolidated by a heat treatment at 1000° C., according to the process of the present invention.

The products obtained after sintering have a microstructure of the type of those presented in FIGS. 2a), 2b) and 3. The relatively regular distribution of the plutonium-bearing aggregates (white spots on the photographs) in the matrix show that the process of the present invention of product preparation meets the objective for obtaining a composite of individualized aggregates enclosing the totality of the mixed oxide. In view of the dilution process chosen, as described in example 5 above, the composite presenting the required qualities can only be obtained if the plutonium-bearing aggregates ($UO_2$—$PuO_2$) used are cohesive enough to preserve their integrity during this step of the process.

The results obtained have shown that the aggregates prepared according to the present invention by mechanical granulation or thermally consolidated at 1000° C. present the properties required for the production of the composites.

What is claimed is:

1. Process for producing a composite material consisting of aggregates of a blend of ground $UO_2$ and $PuO_2$ powder dispersed in a $UO_2$ matrix, comprising the following steps of:
   (a) dry co-grinding a $UO_2$ powder and a $PuO_2$ powder so as to obtain a homogenous primary blend,
   (b) consolidating the primary blend so as to obtain cohesive aggregates of the $UO_2$—$PuO_2$ blend, wherein the blend consolidation step in order to obtain cohesive aggregates comprises the following steps of: (b1) compacting the homogenous primary blend at a pressure in the range of 150 to 600 MPa in order to obtain a blank, (b2) crushing the blank obtained in order to obtain granules, and (b3) spheroidising the granules, or in lieu of steps (b1)–(b3) the blend consolidation step in order to obtain cohesive aggregates is carried out using heat treatment of the primary blend at a temperature of 1000 to 1400° C.,
   (c) sieving the aggregates between 20 and 350 um,
   (d) diluting the sieved aggregates in the $UO_2$ matrix so as to obtain a powder blend,
   (e) pelleting the powder blend, and
   (f) sintering the pellets obtained in order to obtain the composite.

2. Process of claim 1, wherein the blend consolidation step in order to obtain cohesive aggregates comprises the following steps of:
   (a) compacting the homogenous primary blend at a pressure in the range of 150 to 600 MPa in order to obtain a blank,
   (b) crushing the blank obtained in order to obtain granules, and
   (c) spheroidising the granules.

3. Process of claim 2 wherein the compaction of the blend is carried out at a pressure of 300 MPa.

4. Process of claim 1, wherein the consolidation of the primary blend in order to obtain cohesive aggregates is carried out using heat treatment of the primary blend at a temperature of 1000 to 1400° C.

5. Process of claim 4, wherein the consolidation of the primary blend in order to cohesive aggregates is carried out using heat treatment of the primary blend at a temperature of 1000° C.

6. Process of claim 4, wherein consolidation heat treatment is carried out in a humidified or non-humidified atmosphere of 95 vol. % argon and 5 vol. % hydrogen.

7. Process of claim 1, wherein the size of the sieved cohesive aggregates ranges between 125 and 350 µm.

8. Process of claim 1, wherein the $PuO_2$ powder is totally or partially replaced by a discarded manufactured powder comprised of mixed oxides $(U,Pu)O_2$.

9. Process of claim 1, wherein the primary blend of $UO_2$ and of $PuO_2$ is comprised of 60 to 90 wt. % $UO_2$ and 40 to 10 wt. % $PuO_2$ relative to the total mass of the blend.

10. Process of claim 1, wherein the primary blend of $UO_2$ and of $PuO_2$ is comprised of 75 wt. % $UO_2$ and 25 wt. % $PuO_2$ relative to the total mass of the blend.

11. Process of claim 1, wherein the sieved cohesive aggregates are diluted in the $UO_2$ matrix at a concentration of 20 to 35 vol. % relative to the total volume of the powder blend obtained.

12. Process of claim 1, wherein the sieved cohesive aggregates are diluted in the $UO_2$ matrix at a concentration of 20 vol. % relative to the total volume of the powder blend.

13. Process of claim 1, wherein the pelletising step is carried out using a uniaxial hydraulic press.

14. Process of claim 1, wherein the sintering step is carried out at a temperature of approximately 1700° C.

15. Process of claim 1, wherein the sintering step is carried out in a furnace following a thermal cycle comprising the following successive steps of:

(a) raising the temperature at 200° C./hour, (b) stabilizing at approximately 1700° C., and (c) cooling at approximately 400° C./hour down to 1000° C., then by following furnace inertia, wherein the sintering step is preferably carried out in a humidified or non-humidified atmosphere of 95 vol. % argon and 5 vol. % hydrogen.

16. Process of claim 5, wherein consolidation heat treatment is carried out in a humidified or non-humidified atmosphere of 95 vol. % argon and 5 vol. % hydrogen.

* * * * *

UNITED STATES PATENT AND TRADEMARK OFFICE
CERTIFICATE OF CORRECTION

PATENT NO. : 6,984,344 B2  Page 1 of 1
APPLICATION NO. : 10/482772
DATED : January 10, 2006
INVENTOR(S) : Marie-Jeanne Gotta, Grégoire Toury and Maria Trotabas It is certified that error appears in the above-identified patent and that said Letters Patent is hereby corrected as shown below:

ON THE COVER PAGE:

Second Assignee should be corrected to read:

Compagnie Generale des Matieres Nucleaires rather than Compagnie Generalc des Matieres Nucleaires

IN THE CLAIMS:

Claim 1, line 11: should be corrected to read: "between 20 and 350 µm," rather than "between 20 and 350 um,".

Signed and Sealed this

First Day of August, 2006

JON W. DUDAS
*Director of the United States Patent and Trademark Office*